United States Patent [19]
Adar et al.

[11] Patent Number: 6,021,483
[45] Date of Patent: Feb. 1, 2000

[54] PCI-TO-PCI BRIDGES WITH A TIMER REGISTER FOR STORING A DELAYED TRANSACTION LATENCY

[75] Inventors: Etai Adar, Kiryat Motzkin; Ophir Nadir, Haifa; Yehuda Peled, Bet-Sharim, all of Israel

[73] Assignee: International Business Machines Corporation, Armonk, N.Y.

[21] Appl. No.: 09/040,118

[22] Filed: Mar. 17, 1998

[30] Foreign Application Priority Data

Mar. 17, 1997 [EP] European Pat. Off. .............. 97480011

[51] Int. Cl.[7] ...................................... G06F 13/00
[52] U.S. Cl. ................. 712/29; 712/28; 712/31; 712/33; 712/37; 712/38; 712/40; 710/62; 710/101; 710/107; 710/129; 710/250; 710/262
[58] Field of Search .................... 712/28, 29, 31, 712/33, 37, 38, 40; 710/62, 101, 107, 129, 250, 262

[56] References Cited

U.S. PATENT DOCUMENTS

| | | | |
|---|---|---|---|
| 5,632,021 | 5/1997 | Jenning et al. .......................... | 710/129 |
| 5,802,324 | 9/1998 | Wunderlich et al. .................... | 710/101 |
| 5,805,836 | 9/1998 | Barnhart et al. ......................... | 710/107 |
| 5,838,932 | 11/1998 | Alzien ..................................... | 710/128 |
| 5,850,557 | 12/1998 | McTague et al. ........................ | 710/262 |
| 5,857,082 | 1/1999 | Murdoch et al. ........................ | 395/308 |
| 5,884,027 | 3/1999 | Garbus et al. ........................... | 709/250 |
| 5,911,084 | 1/1999 | Jones et al. .............................. | 710/62 |

*Primary Examiner*—Meng-Ai T. An
*Assistant Examiner*—Dzung C Nguyen
*Attorney, Agent, or Firm*—Robert A. Walsh

[57] ABSTRACT

To improve the efficiency of delayed transactions in bus-to-bus bridge systems which include at least one interface to a PCI bus, a bridge system is disclosed including at least a primary interface and an interface to a secondary subsystem for interconnecting a primary PCI bus system and the secondary subsystem. The system comprises a delayed transaction mechanism for enabling a transaction source attached to the primary PCI bus system to effect delayed transactions with a target in the secondary subsystem. This system has a programmable delay transaction timer which provides a degree of flexibility in the configuration of PCI systems. This flexibility can be exploited to provide considerable efficiency gains, albeit at the expense of some deviation of the strict requirements of the PCI Specification.

7 Claims, 2 Drawing Sheets

PCI-TO-PCI BRIDGES WITH A TIMER REGISTER FOR STORING A DELAYED TRANSACTION LATENCY

BACKGROUND OF THE INVENTION

1. Field of the Invention

This invention relates to a bus to bus bridge system and, more particularly, to a bus-to-bus bridge system with an improved mechanism for handling delayed transactions.

2. Background Description

Recently, there has been developed a high performance bus architecture known as the Peripheral Component Interface (PCI) bus. The PCI bus is primarily designed for use in personal computers to interconnect peripheral devices with the local bus of a central processor and main memory. The bus was designed to have high throughput and to take advantage of the increasing numbers of processors which support I/O functions by moving peripheral functions which have high bandwidth requirements, such as audio and video functions, closer to the processor local bus.

A full description of the PCI bus architecture can be found in the PCI Local Bus Specification Revision 2.1 which is available from the PCI Special Interest Group and which is hereby incorporated by reference. The PCI Local Bus specification defines a specific set of protocols, including signal timing requirements and the like, for bus transactions as well as specific electrical and mechanical specifications for the bus interfaces.

Since the PCI specification limits the number of peripheral devices which may be attached to the bus, systems have been developed which provide a connection path between one PCI bus and another PCI bus and which enable transactions to be performed between a transaction source on one PCI bus and a transaction target on another PCI bus. Such systems are known as PCI-to-PCI bridges and a number of commercially available components are available to implement such systems, for example the 21052 chip available from Digital Equipment Corp. and the IBM27-82351 chip available from IBM Corp.

A general description of a PCI-to-PCI bridge can be found in the PCI-to-PCI Bridge Architecture Specification Revision 1.0 which is available from the PCI Special Interest Group and which is hereby incorporated by reference.

A PCI-to-PCI bridge has two PCI interfaces, the primary and secondary. Each interface is capable of either master or target operation. The bridge functions as a target on the bus on which a transaction is initiated, the 'initiating bus', on behalf of the real target which actually resides on the other PCI bus, the 'target bus'. Likewise the bridge functions as a transaction source, or master, on the target bus on behalf of the master which actually resides on the initiating bus.

One feature of the PCI bus protocols which was introduced with revision 2.1 of the PCI Local Bus Specification is known as a delayed transaction. Delayed transaction termination is used by targets which cannot complete the initial data phase of a transaction within the timing requirements of the PCI specification. It is used by two types of components: I/O controllers, which interconnect a PCI bus and an I/O subsystem, and bridges, in particular PCI-to-PCI bridges.

A delayed transaction is carried out in three phases as follows.

First a request is made by a master. The information required to complete the transaction is latched by the target and the request is terminated with retry by the target. The master cannot distinguish between a target which is completing a transaction using delayed transaction termination and a transaction which cannot be completed for whatever other reason.

Second, the request is completed by the target independently using the latched information and the results are stored in the target until the master reissues the original request. During the delayed transaction the master repeatedly rearbitrates for access to the bus to reissue the original request.

Once the request has been completed by the target and the results are available and the master has been able to reissue the request, the master is able to complete the transaction.

The advantage of a delayed transaction is that the bus is not held in wait states while completing a transaction with a slow device. Whilst the originating master rearbitrates for the bus to reissue the original request, other bus masters can make use of the bus bandwidth. It also enables non-posted transactions to be accepted whilst posted transactions are pending in the target, the non-posted transactions being completed as delayed transactions after handling of the pending posted transactions.

The PCI specification sets requirements as to the number of cycles from the beginning of a transaction, the assertion of a FRAME# signal by the master, to the completion of the initial data phase, ie the assertion of a TRDY# signal by the target, or the issuance of a retry or stop abort signal by the target, ie the assertion of a STOP# signal by the target.

According to the PCI specification, all targets are required to complete the initial data phase of a transaction within 16 clocks from the beginning of the transaction, ie the assertion of the FRAME# signal by the master. This period is extended to 32 clocks for host bus bridges.

A device which cannot meet the 16 or 32 cycle rule must activate the delay transaction termination mechanism.

Observance of this 16-cycle requirement is important for other devices on the PCI bus since it determines the maximum length of bus transactions. This, in turn, determines the time other bus masters expect to have to wait before they are granted access to the bus. This expected waiting time, known generally as the bus latency, has implications for other design parameters, such as buffer sizes or the like, within the PCI devices. Consequently, a PCI bridge device attached to the bus cannot use a different delay value without the risk of impacting the performance of other devices attached to the PCI bus.

SUMMARY OF THE INVENTION

Accordingly, it is an object of this invention to improve the efficiency of delayed transactions in bus-to-bus bridge systems which include at least one interface to a PCI bus.

In brief, this object is achieved by a bridge system including at least a first PCI interface and an interface to a secondary subsystem for interconnecting a first PCI bus system and the secondary subsystem.

The system comprises a delayed transaction mechanism for enabling a transaction source attached to the first PCI bus system to effect delayed transactions with a target in the secondary subsystem.

The delayed transaction mechanism comprises means for receiving a transaction request from a transaction source and transmitting said request to a target in the secondary subsystem.

A timer register is provided storing a delayed transaction latency. Timing logic is arranged to read the timer register and to provide a timer expired signal if the time between receipt of a transaction request exceeds the delayed transaction latency.

There are provided means responsive to the timer expired signal to terminate the transaction request with retry, means to receive a request completion signal from the target; and means for receiving a transaction completion request from the transaction source and in response thereto enabling the transaction source to complete the transaction if the request completion signal has been received from the target.

The system is characterised in that data input means are provided for enabling the latency in the timer register to be set to a desired value, whereby the latency may be optimised according to the timing characteristics of the transaction sources to be attached to the first PCI bus and the targets in the secondary subsystem.

There is thus provided a programmable delay transaction timer which provides a degree of flexibility in the configuration of PCI systems. This flexibility can be exploited to provide considerable efficiency gains, albeit at the expense of some deviation of the strict requirements of the PCI Specification. However, the inventors have observed that for many applications, particularly in subsystems in which a number of devices of similar functionality are interconnected by a PCI bus or within option cards or the like provided by one manufacturer and where the PCI bus is used effectively as an internal bus, strict compliance with the PCI specification may not be required.

In the case of systems that often cannot meet the 16 cycle rule of the PCI specification, the user can program this timer to a relatively small number of cycles. In such systems there is no point in waiting 16 cycles before using the delay transaction termination, since this merely wastes bus bandwidth. Having the target effect the delay transaction termination earlier frees the bus bandwidth to be used by other masters.

In the case of systems in which it is important to connect the master and the target of a transaction, but in which bus bandwidth is not so important, it is possible to set the timer so that the target waits for longer before effecting the delay transaction termination so that the probability of such a connection being created is increased.

In a preferred embodiment the secondary subsystem is also a PCI bus system, the bridge comprising a second PCI interface for connection to the PCI bus of the secondary subsystem. However, application of the invention to other types of bridge systems, such as I/O controllers, which include at least one PCI interface is not excluded.

The invention further enables an option card for a computer to be provided, the option card comprising a plurality of PCI devices interconnected by a PCI bus and a bridge system as described above having the first PCI interface connected to the PCI bus and being arranged so that the interface to the secondary subsystem can be connected to a bus system within the computer.

Also provided is a computer comprising a plurality of PCI devices interconnected by a PCI bus and the above described bridge system arranged to interconnect the PCI bus and another bus system, for example a second PCI bus or an ISA bus, within the computer.

In either case, the value stored in the first or second timer register may deviate from the requirements of the PCI local bus specification to provide the advantages set out above. Preferably, the manufacturer or supplier of such products would have sufficient control or influence over the design of the other devices attached to the PCI bus to ensure that their performance is not unsatisfactorily impacted.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
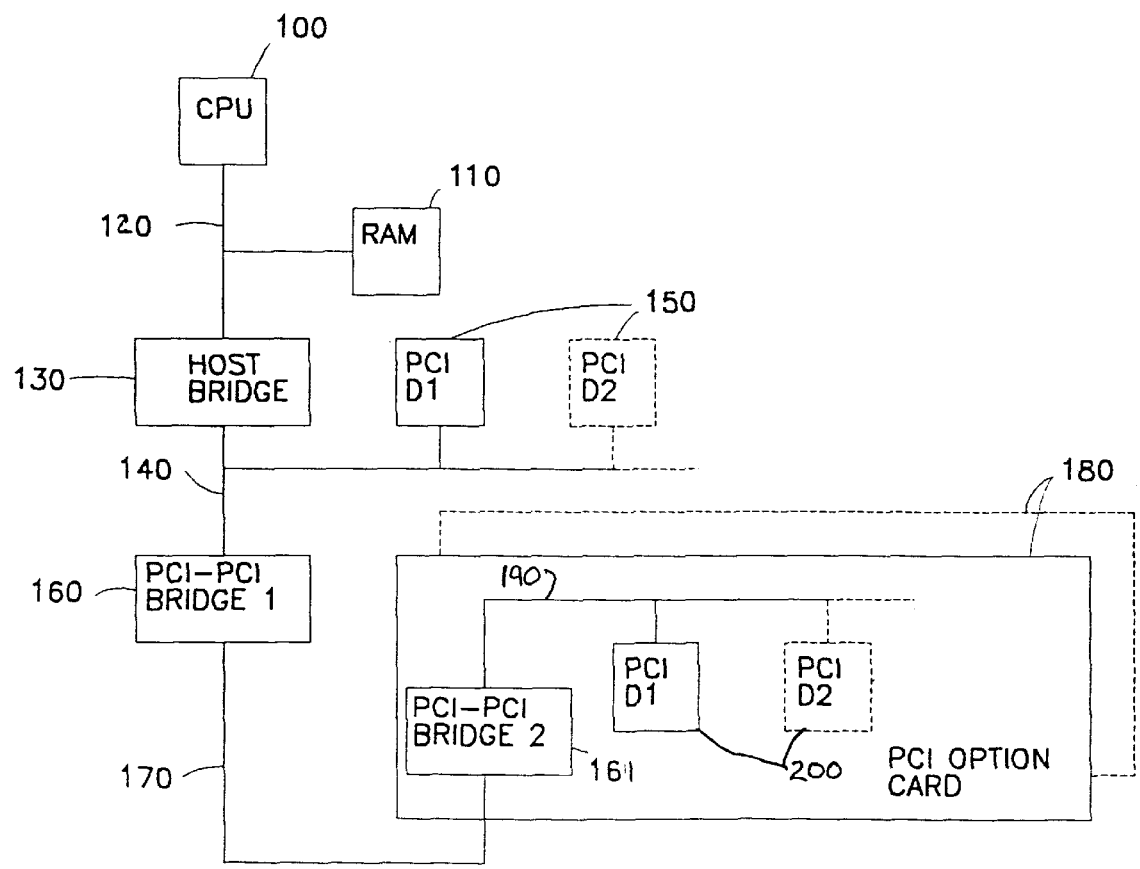
FIG. 1 illustrates two typical applications for PCI-to-PCI bridges.

Referring to FIG. 1, there is shown a data processing system which illustrates two typical applications for PCI-to-PCI bridges. The system comprises CPU 100 and main memory 110 which are interconnected by a host bus 120.

Host bus bridge 130 interconnects the host bus to a first PCI bus 140 which typically is located on the motherboard of a personal computer. Also connected to this first PCI bus are PCI devices 150 comprising functions which are implemented on the motherboard, which may be any kind of PCI peripheral devices. PCI devices typically located on the motherboard would be a hard disk controller and a PCI-ISA bus bridge device for allowing ISA bus devices to be connected to the system.

A first PCI-to-PCI bridge 160 connects PCI bus 140 to a second PCI bus 170 which interconnects a number of PCI option cards 180. Examples of such option cards would be audio and/or video cards or the like. Such PCI option cards 180 may themselves contain a number of PCI devices 200 which are interconnected by a third PCI bus 190. A second PCI-to-PCI bridge 161 allows the PCI bus 190 to be connected to PCI bus 170.

Example of PCI option cards which contain a number of PCI devices would be a token ring or ethernet network interface card which includes functionality for concurrent connection to more than one network and a disk controller or file server card for controlling a number of hard disk devices.

Figure 2:
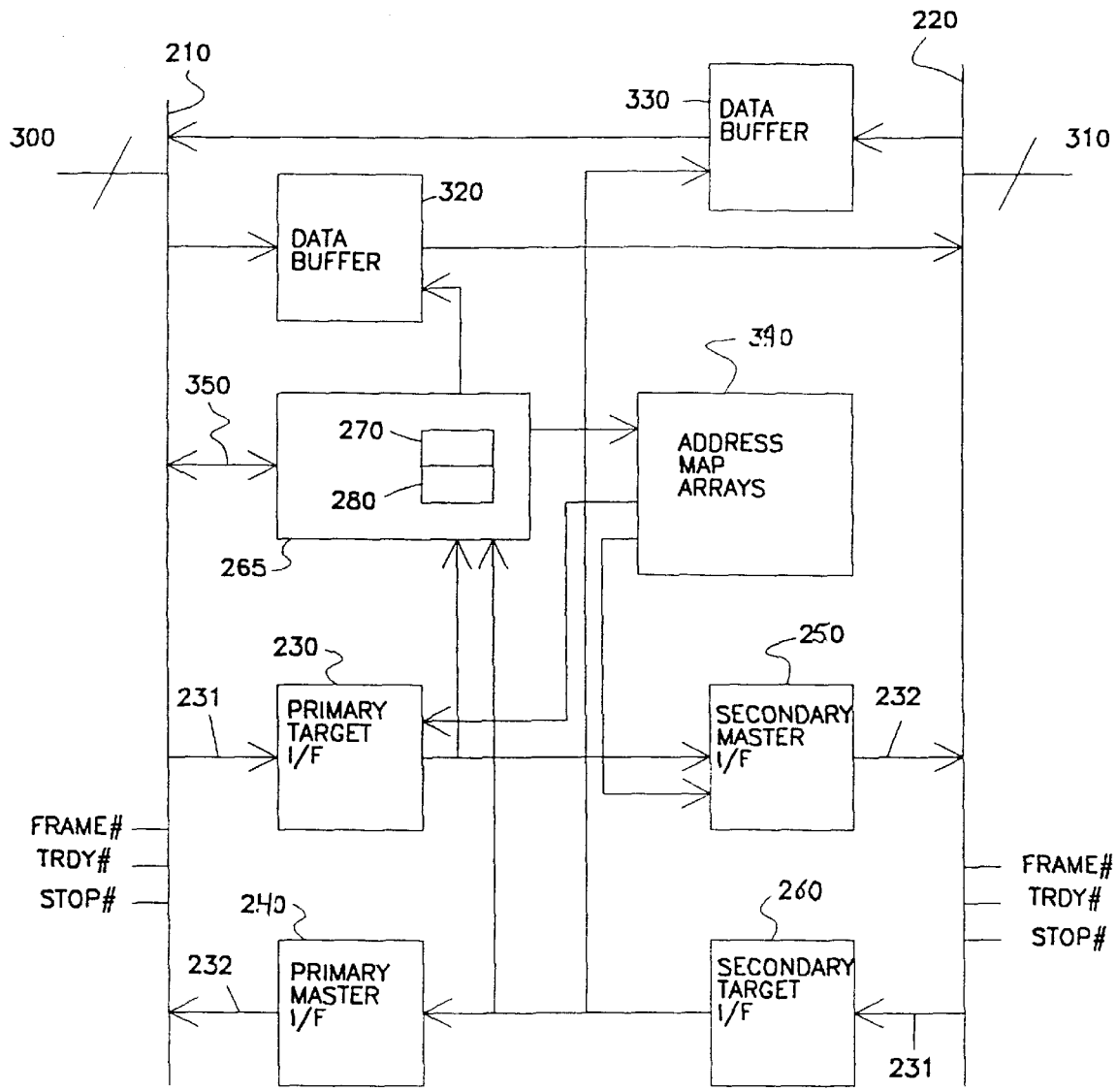
FIG. 2 shows in general and schematic form the configuration of one of the PCI-to-PCI bridges of FIG. 1.

FIG. 2 shows in general and schematic form the configuration of one of the PCI-to-PCI bridges 160. A primary PCI bus 210 is connected to a secondary bus 220. As is conventional, PCI-to-PCI bridge 160 includes primary master and target interface state machines 230 and 240 connected to primary bus 210 and secondary master and target interface state machines 250 and 260 connected to secondary bus 220. These state machines are connected to the primary and secondary PCI buses by various control lines, including a FRAME# control line, a TRDY# control line, and a STOP# control line, for both the primary and secondary PCI interfaces.

The FRAME# control line is asserted by another PCI device on the respective PCI bus when it wishes to initiate a transaction. The TRDY# control line is asserted by a target when the initial data phase is complete. The STOP# control line is asserted by a target in the event of a delayed transaction termination.

The general operation of such state machines will be well understood by those skilled in the art and need not be described in detail herein.

Also included within PCI-to-PCI bridge 160 are a set of configuration registers generally designated at 265 including two registers 270 and 280. Each target state machine includes timing logic (not shown) which controls the state machine and, in particular, is arranged to read the configuration registers 270 and 280 and operate as described below.

The operation of a PCI-to-PCI bridge with this general design will be well understood by those skilled in the art. Should further details be required, they may be found in the data book for the IBM27-82351 PCI-to-PCI bridge chip which is available from IBM Corp and which is incorporated herein by reference.

Data from the primary bus passes over multiplexed address/data paths 300 and 310, via data buffers 320 and 330 if necessary, under the control of the state machines 230, 240, 250 and 260, configuration registers 265 and address map arrays 340.

Primary Delayed Transaction Timer Register (PDTR) 270 contains a value defining the number of cycles that the timing logic in the primary target state machine counts from the time a master on the primary bus asserts FRAME#, issuing a read or non-posted write transaction, until the transaction is stored as a delayed request. If during that time the bridge is able to obtain access to the secondary bus 220 and is able to assert TRDY# on the primary bus indicating that the transaction is completed, the transaction will not be stored as a delayed request. If during that time the bridge is not able to assert TRDY# on the primary bus, the timing logic issues a timer expired signal and the bridge 160 issues a retry to the master on primary bus 210 and the transaction is completed as a delayed transaction.

The default value stored in register 270 corresponds to a delay of 16 cycles, however the value may be programmed by writing suitable values into register 270, which is defined as a particular address in memory space. This is achieved via control I/O commands which are issued over programming and configuration interface 350. In this embodiment, valid values correspond to delays between 4 cycles and 127 cycles.

Secondary delay timer register 280 operates in substantially the same way except that it determines the latency for transactions initiated on the secondary bus 220.

Apart from the feature that the latency is determined by the values in the registers 270 and 280, the operation of the bridge 160 to effect delayed read transactions and delayed write transaction between masters on one side of the bus and targets on the other is exactly as described in the PCI Local Bus Specification Rev 2.1.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A bridge system including at least a PCI interface and an interface to a secondary subsystem for interconnecting a first PCI bus system and the secondary subsystem, the bridge system having a delayed transaction mechanism for enabling a transaction source attached to the first PCI bus system to effect delayed transactions with a target in the secondary subsystem, the delayed transaction mechanism comprising:

means for receiving a transaction request from a transaction source and transmitting said request to a target in the secondary subsystem;

a timer register for storing a delayed transaction latency;

timing logic arranged to read the timer register and to provide a timer expired signal if the time between receipt of a transaction request exceeds the delayed transaction latency;

means responsive to the timer expired signal to terminate the transaction request with retry;

means to receive a request completion signal from the target;

and means for receiving a transaction completion request from the transaction source and in response thereto enabling the transaction source to complete the transaction if the request completion signal has been received from the target, characterised by data input means for enabling the latency in the timer register to be set to a desired value, whereby the latency may be optimised according to the timing characteristics of the transaction sources to be attached to the first PCI bus and the targets in the secondary subsystem.

2. A bridge system as claimed in claim 1 wherein the secondary subsystem is a PCI bus system, the bridge comprising a second PCI interface for connection to the PCI bus of the secondary subsystem.

3. A bridge system as claimed in claim 2 includes a second delayed transaction mechanism for enabling a transaction source attached to the second PCI bus system to effect delayed transactions with a target in the first PCI bus system, the second delayed transaction mechanism comprising:

means for receiving a transaction request from a transaction source and transmitting said request to a target in the first PCI bus system;

a second timer register for storing a delayed transaction latency;

timing logic arranged to read the second timer register and to provide a timer expired signal if the time between receipt of a transaction request exceeds the delayed transaction latency;

means responsive to the timer expired signal to terminate the transaction request with retry;

means to receive a request completion signal from the target;

means for receiving a transaction completion request from the transaction source and in response thereto enabling the transaction source to complete the transaction if the request completion signal has been received from the target, and data input means for enabling the latency in the second timer register to be set to a desired value.

4. An option card for a computer, the option card comprising:

a plurality of PCI devices interconnected by a PCI bus; and a bridge system including a PCI interface and an interface to a secondary subsystem for interconnecting a first PCI bus system and the secondary subsystem, the bridge system having a delayed transaction mechanism for enabling a transaction source attached to the first PCI bus system to effect delayed transactions with a target in the secondary subsystem, the delayed transaction mechanism having:

means for receiving a transaction request from a transaction source and transmitting said request to a target in the secondary subsystem;

a timer register for storing a delayed transaction latency;

timing logic arranged to read the timer register and to provide a timer expired signal if the time between receipt of a transaction request exceeds the delayed transaction latency;

means responsive to the timer expired signal to terminate the transaction request with retry;

means to receive a request completion signal from the target;

and means for receiving a transaction completion request from the transaction source and in response thereto enabling the transaction source to complete the transaction if the request completion signal has been received from the target, characterised by data input means for enabling the latency in the timer register to be set to a desired value, whereby the latency may be optimised according to the timing characteristics of the transaction sources to be attached to the first PCI bus and the targets in the secondary subsystem, and the bridge system having the first PCI interface connected to the PCI bus and being arranged so that the interface to the secondary subsystem can be connected to a bus system within the computer.

5. An option card as claimed in claim 4 wherein the value stored in the first or second timer register deviates from the requirements of the PCI local bus specification.

6. A computer comprising:

a plurality of PCI devices;

a PCI bus interconnecting said devices;

a second bus system; and a bridge system including a PCI interface and an interface to a secondary subsystem for interconnecting a first PCI bus system and the secondary subsystem, the bridge system having a delayed transaction mechanism for enabling a transaction source attached to the first PCI bus system to effect delayed transactions with a target in the secondary subsystem, the delayed transaction mechanism having:

means for receiving a transaction request from a transaction source and transmitting said request to a target in the secondary subsystem;

a timer register for storing a delayed transaction latency;

timing logic arranged to read the timer register and to provide a timer expired signal if the time between receipt of a transaction request exceeds the delayed transaction latency;

means responsive to the timer expired signal to terminate the transaction request with retry;

means to receive a request completion signal from the target;

and means for receiving a transaction completion request from the transaction source and in response thereto enabling the transaction source to complete the transaction if the request completion signal has been received from the target, characterised by data input means for enabling the latency in the timer register to be set to a desired value, whereby the latency may be optimised according to the timing characteristics of the transaction sources to be attached to the first PCI bus and the targets in the secondary subsystem; and arranged to interconnect the PCI bus and the second bus system.

7. A computer as claimed in claim 6 wherein the value stored in the first or second timer register deviates from the requirements of the PCI local bus specification.

* * * * *